Oct. 8, 1940.    A. F. HENNINGER ET AL    2,217,315
LIGHT SOURCE
Filed Dec. 23, 1937    3 Sheets-Sheet 1
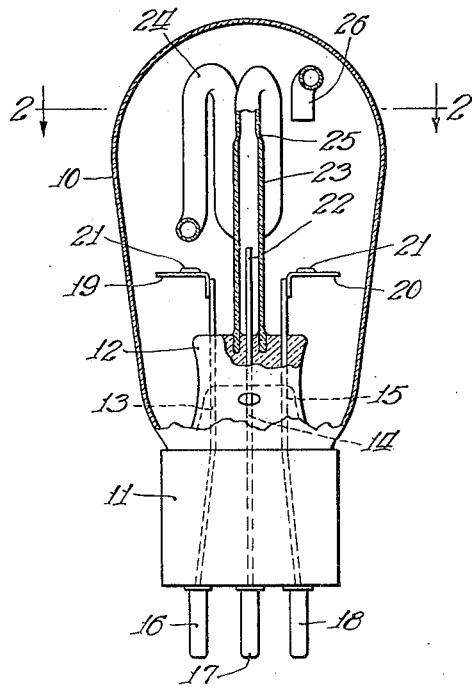
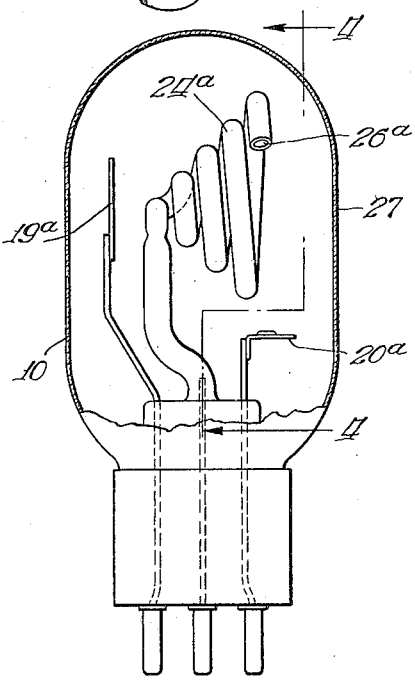
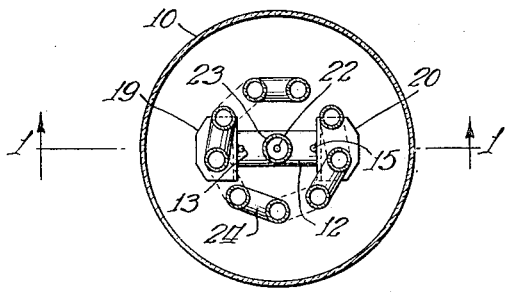
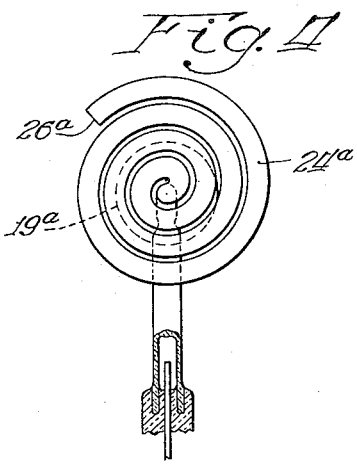
Inventors:
Andrew F. Henninger and
George D. Henninger
By: *[signature]* Attys.

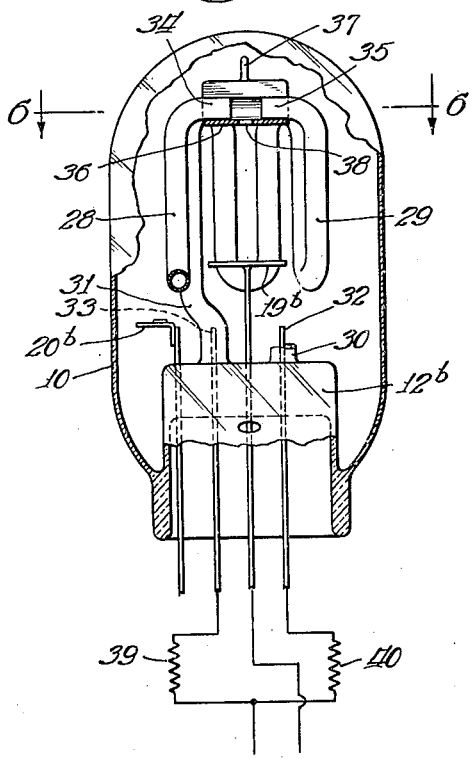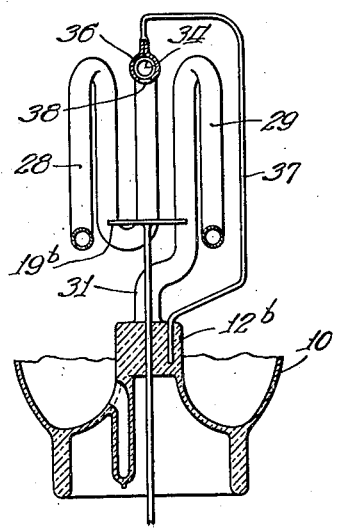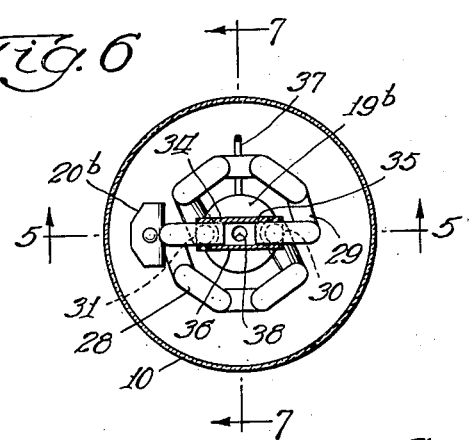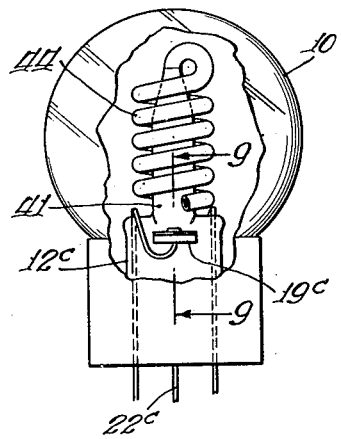

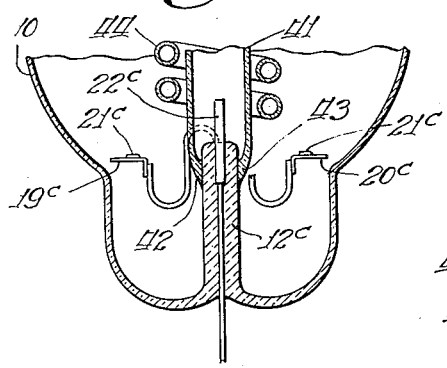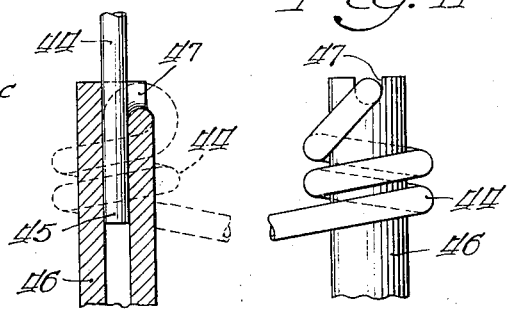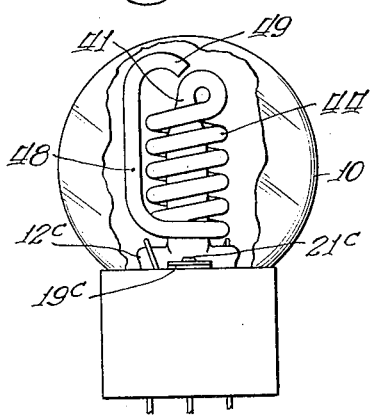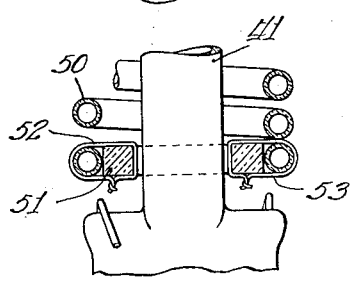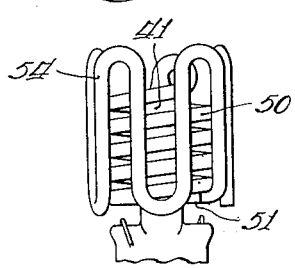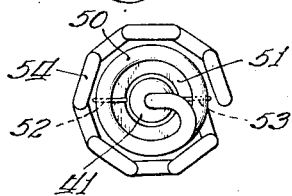

Patented Oct. 8, 1940

2,217,315

UNITED STATES PATENT OFFICE 2,217,315

LIGHT SOURCE

Andrew F. Henninger and George D. Henninger, Chicago, Ill.

Application December 23, 1937, Serial No. 181,361

8 Claims. (Cl. 176—122)

The present invention relates to means for providing a reliable light source which has a low current consumption and which is particularly adapted for use as a danger signal or a light where high visibility and low current consumption are important factors in determining the success of the light unit. It is the principal purpose of this invention to provide a light source in the form of a compact tube or envelope having therein a gaseous filling adapted to be excited by the passage of electric current therethrough to produce light within the envelope, the construction of parts in the envelope being such that a concentrated glow due to the light in the positive column is combined with additional emission of light by a glow within the envelope outside of the positive column.

The present invention contemplates, as a means for carrying out the purposes of the invention, an envelope containing a gaseous filling which is made up preferably of one or more of the monatomic gases such as Neon, Helium, Argon, Krypton and Xenon, and Mercury vapor. The envelope is provided with means for maintaining the gaseous filling at a high degree of purity, and care is exercised in the manufacture of the device to insure the original purity of the gas filling. The envelope contains an elongated tube which opens into the interior of the envelope whereby to be filled with the gaseous filling of the envelope, the tube being provided at a point most remote from the opening with an electrode, and the envelope being provided with an electrode which is also spaced from the opening of the tube into the interior of the envelope.

The invention also contemplates the provision of a device of the aforementioned characteristics wherein the tube within the envelope is bent into a tortuous form enabling one to use a comparatively long length of tubing in which successive sections are closely adjacent to each other to provide a concentrated source of light emission, which, although concentrated, does not have the characteristics of a point or a line source of emission such as is normally associated with incandescent filaments.

The features and advantages of the invention will appear more fully as the description proceeds in connection with the accompanying drawings wherein a preferred form of the invention is shown. It is to be understood however that the drawings and description are illustrative only and should not be considered as limiting the invention except insofar as it is limited by the claims.

In the drawings—

Fig. 1 is a view in side elevation of a lighting unit embodying the invention, certain parts being shown in section;

Fig. 2 is a plan sectional view taken on the line 2—2 of Fig. 1;

Fig. 3 is a view similar to Fig. 1 showing a slightly modified form of the invention;

Fig. 4 is a fragmentary view in side elevation taken on the line 4—4 of Fig. 3;

Fig. 5 is a vertical sectional view taken on the line 5—5 of Fig. 6 and illustrating a modified form;

Fig. 6 is a sectional view taken on the line 6—6 of Fig. 5; a

Fig. 7 is a sectional view taken on the line 7—7 of Fig. 6;

Fig. 8 is a view in side elevation of a further form of the invention, the envelope being broken away to show the interior construction;

Fig. 9 is an enlarged fragmentary sectional view taken on the line 9—9 of Fig. 8;

Figs. 10 and 11 are fragmentary views illustrating the manner of forming helical tubing employed in the form shown in Figs. 8 and 9;

Fig. 12 is a view similar to Fig. 8, illustrating a further modification;

Fig. 13 is an enlarged fragmentary sectional view illustrating a further modification;

Fig. 14 is a view in side elevation of the stem and tube portions of a further modified form of the invention, and Fig. 15 is a plan view of the form shown in Fig. 14, the envelope and electrode constructions, which are the same as in the form shown in Figs. 8 and 9, being left off for the sake of clearness.

Referring now in detail to the drawings, the present invention is embodied in a gaseous conduction tube comprising an envelope 10 which may be made of glass or other suitable material. The envelope 10 is mounted upon a suitable base 11 in the usual manner and is provided with a re-entrant stem 12 through which a series of leads 13, 14 and 15 extend. The base has terminal plugs 16, 17 and 18 for the leads. The leads 13 and 15 carry electrodes 19 and 20, each of which has thereon a body 21 of a suitable clean-up material which is adapted to clean up the impurities in the envelope 10. The material of the electrodes 19 and 20 preferably is nickel in the form of a plate which is secured to the lead by any suitable means to establish a good electrical and mechanical connection. Other materials, of course, may be used if suitable for the electrodes. The lead 14 terminates in an electrode 22 which is quite small in surface area as compared to the electrodes 19 and 20. It desirably may consist of a pure iron wire although, it is well-known in the art, of course, any other material suitable as an anode may be used.

A glass tube 23 is molded into the stem 12 around the electrode 22 and supports an elongated tube 24 which is sealed to the tube 23 at 25 a substantial distance away from the electrode 22.

The construction of the tube 24 is preferably such as to incorporate a substantial length of tubing in a small space. As shown in Figs. 1 and 2, tube 24 is bent into a tortuous outline by doubling it back and forth upon itself so that a tube much longer than the length of the envelope 10 may be placed within the envelope. The free end of the tube 24 shown at 26 is open to the interior of the envelope 10 and is spaced substantially as far from the normally active electrode 19 as it can be.

In making up the device, the envelope 10 before it is sealed is preferably treated in the usual manner to get all of the foreign gases out of the interior thereof and out of the glass tubes 23 and 24. The envelope is then evacuated and filled with a suitable gas or mixture of gases such as one or more of the gases hereinbefore mentioned. For the purpose of providing a light source of high visibility, I prefer to use neon gas because it has the characteristic of being visible for a greater distance through fog and similar atmospheric conditions than gases giving other colors of light. A relatively high vacuum is desired in the envelope, and the impurities which develop in the initial operating of the tube are cleaned up by the clean up material 21 upon the electrodes 19 or 20 in operation. Normally, the source of current is connected across the electrodes 19 and 22 for the purpose of operation and the electrode 20 is only used when impurities tend to adversely affect the glow within the envelope. The bodies 21 which are usually referred to as flash pellets are preferably composed of a combination of barium and magnesium although, of course, other known clean up agents commonly used for this purpose such as caesium may be employed. By maintaining an extreme purity of the gas, the flaming effect such as is described in Henninger Patent 2,020,413 may be obtained in the envelope 10 outside of the tube 24.

In operation, the terminals 16 and 17 are desirably connected to a source of alternating current or direct current. The large electrodes 19 and 20 serve as cathodes while the small electrode 22 acts as an anode. With alternating current point to plate rectification takes place and therefore the sputtering if any is confined to the large electrodes such as 19 or 20. The light emitted from within the tube 24 is the positive column portion and therefore a relatively intense emission of light is obtained from the tube 24. Owing to the purity of the gas filling and the arrangement of the electrode 19 in spaced relation to the open end 26 of the tube 24, the interior of the envelope around the tube 24 produces further emission of light and the flaming effects hereinbefore mentioned which add to the efficiency of the device as a source of light.

Referring now to the form of the invention shown in Figs. 3 and 4, the tube 24a is shown here as coiled into a spiral helix, the electrode 19a being located back of the apex of the helix and the open end 26a of the tube 24a being at the remote end of the tube from the electrode 19a. The electrode 20a is placed below the tube 24a so as to give a clear unobstructed view of the open end of the helix. In this form of the invention, if desired, the envelope 10 may be coated so as to render it opaque except on the side 27 toward which the helix faces.

Referring now to Figs. 5–7 inclusive, the form of the invention shown therein is one in which the inner tortuous tube construction comprises a pair of tubes 28 and 29. The tube 28 is sealed to a tube 30 that is mounted in the stem 12b of the envelope 10. The tube 29 is sealed to a tube 31 that is also mounted directly in the stem 12b, the seal in this form of the invention as in the other forms being spaced well above the upper ends of electrodes 32 and 33 in the tube 30 and 31 respectively. The upper ends of the tubes 28 and 29 are turned inwardly toward each other as shown at 34 and 35 and are connected by a sleeve 36. The sleeve 36 comprises a strip which is folded around the ends 34 and 35 and secured to a wire support 37 that extends upwardly from the stem 12b. The sleeve 36 is provided with an opening 38 that is directed downwardly and an electrode 19b is mounted directly below the opening 38, being spaced from the opening a substantial distance as shown clearly in Figs. 5 and 7. An auxiliary electrode 20b is provided as in the other forms for the purpose of supplying clean up material in the event that impurities adversely affect the operation of the device after it is completed.

It will be noted from an inspection of Fig. 6 that the tubes 28 and 29 are bent to form a substantially cylindrical outline and that the discharge from the electrodes 32 and 33 in the device passes through the opening 38 and then downwardly at the center of the cylindrical outline to the cathode 19b. In order to regulate the flow of current to two tubes 28 and 29 any suitable regulating means such as resistances 39 and 40 may be employed between the electrodes 32 and 33 and their connection to the source of current.

As stated hereinbefore, the curved tubing in each form of the device is sealed to the tubing that is mounted in the stem at a point well above the electrode that is within the tubing. In sealing tubing of this character together, the joint may be rough and thin in spots and therefore the seal is made at a point remote from the electrode. This protects tubing against breakdown in bombardment of the device by providing a solid tube at the point of greater stress which is directly between the electrodes in the tubes and the electrodes that are in the envelope outside the tubes.

Referring now to Figs. 8 and 9, in this form of the invention there is illustrated another method of arranging the elongated tubing within the gas filled envelope 10. The press or stem 12c is the support for a small electrode 22c. A glass tube 41 is sealed on the stem 12c in the manner shown in Fig. 9 so that the side portions 42 and 43 of the tube 41 overlap the stem and the stem-to-tube joint is extended below the top of the stem on opposite sides thereof.

The tube 41 is drawn to a smaller bore at the top and is cut off to provide a straight edge to which a helical glass tube 44 is sealed. The tube 44 is formed by inserting one end 45 of a straight tube into a tubular sleeve 46 that has a rounded slot 47 in the wall thereof at one end. The glass tube 44 is then bent over and wound around the sleeve 46 until the desired length of helix has been produced. Heat necessary to enable ready bending of the glass tube is of course employed. The outer diameter of the sleeve 46 is such that the helical glass tubing will fit closely upon the larger tube 41 but will have sufficient clearance to allow for normal expansion without damage. The end 45 of the helical tubing 44 is cut off close to the beginning of the curvature and then sealed on to the small top end of the glass tube 41. The close fit of the helical tubing 44 upon the tube 41 prevents vibrations of the helical tube of sufficient magnitude to cause excessive strains upon the joint between the helical tubing and the tube 44. Furthermore, in the event that an assembled tube is defective, the helical tubing 44 is readily salvaged for further use by merely cutting it off at its junction with the tube 41.

In the form of invention shown in Fig. 12, the construction throughout is the same as in the form shown in Figs. 8 and 9, except that the helical tubing 44 has an extension 48 that extends upwardly and terminates in a down-turned end 49 directly over the tube 41. This form of the device has the advantage that it places the open end of the tubing 44 at the opposite end of the envelope from the electrodes 19c and 20c and will enhance the glow in the envelope around the tube 41.

In Fig. 13, a form of the invention is illustrated in which the tube 41 is surrounded by a helical tubing 50 which is wound on a larger radius to provide a helical tube which will produce a much larger light source than the form shown in Figs. 8 and 9. The coils of the tubing 50 are widely spaced from the tube 41 in this form. In order to relieve the strain upon the connection of the tubing 50 to the tube 41, a bushing 51 is employed. This bushing is a ring of suitable insulating material such as lava, glass, etc. The ring 51 is fitted closely upon the tube 41 and is secured to the lower convolution of the tubing 50 by tie wires 52 and 53.

In the construction shown in Figs. 14 and 15, the tubing 50 is coupled to an annulus 54 of tubing which is made up of a series of undulations and encircles the tubing 50 to further increase the size of light source and the length of tubing between the electrodes. The bushing 51 is also used in this form of the invention.

This device is particularly advantageous when used as a channel marker or buoy light for aid in navigation. It may be operated from batteries by means of an interrupter at a very low current consumption. The current from the interrupter may be passed through a transformer to give the necessary high voltage, and owing to the arrangement of the tube within the envelope and the large and small electrodes, the current is substantially limited to a flow in one direction. High visibility with low current consumption makes it possible to use this device without providing such a heavy and extensive battery unit as is necessary for operating incandescent lamps under the same conditions. The comparative tests which have been made show that with this device we can obtain a visibility equal to that obtained with modern incandescent lamps using about five times the current necessary for this device.

The construction of the device gives a large unit or body of light in contrast to the line or point of line obtained from a filament. When the light is projected through a lens, it is visible over a wider area than the filament type of light because of this larger body. Therefore, the tipping of the support, which is a factor to be considered in floating markers, does not affect the visibility of the marker as much as it would a marker with a point source of light.

When it is desired to clean up impurities in the gas that appear after the device has been in operation, it is not necessary to apply excessive current or a high heat to the device. When the gas is in need of purification, we merely connect the electrode 20 which is normally not in service into the circuit with one of the other electrodes, to use up the flash pellet 21 thereon and thus purify the gas.

From the above description, it is believed that the construction and advantages of this device will be readily apparent to those skilled in this art. Having thus described our invention, what we claim as new and desire to secure by Letters Patent is:

1. Means for providing a light source comprising in combination an outer envelope filled with a gaseous medium adapted to emit light when excited by the passage of electric current through it, an elongated tortuous translucent tube having one end opening into the interior of said envelope and the other end fixed to said envelope, an electrode in said tube at said fixed end, and an electrode in said envelope spaced from the open end of said tube, said tube comprising a central portion extending from the fixed end, and a helical portion extending from the free end of said central portion around the central portion toward the fixed end.

2. Means for providing a light source comprising in combination an outer envelope filled with a gaseous medium adapted to emit light when excited by the passage of electric current through it, an elongated tortuous translucent tube having one end opening into the interior of said envelope and the other end fixed to said envelope, an electrode in said tube at said fixed end, and an electrode in said envelope spaced from the open end of said tube, said tube comprising a central portion extending from the fixed end, and a helical portion extending from the free end of said central portion around the central portion toward the fixed end, said helical portion being wound around the central portion to a point adjacent the fixed end thereof, the helical portion having a ring therein adjacent the fixed end of said central portion.

3. Means for providing a light source comprising in combination an outer envelope filled with a gaseous medium adapted to emit light when excited by the passage of electric current through it, an elongated tortuous translucent tube having one end opening into the interior of said envelope and the other end fixed to said envelope, an electrode in said tube at said fixed end, and an electrode in said envelope spaced from the open end of said tube, said tube comprising a central portion extending from the fixed end, and a helical portion extending from the free end of said central portion around the central portion toward the fixed end, said helical portion comprising a series of closely spaced convolutions terminating close to the fixed end of said central portion in a convolution that is limited by the central portion against swinging that may be caused by vibrations of the envelope.

4. Means for providing a light source comprising in combination an outer envelope filled with a gaseous medium adapted to emit light when excited by the passage of electric current through it, an elongated tortuous translucent tube having one end opening into the interior of said envelope and the other end fixed to said envelope, an electrode in said tube at said fixed end, and an electrode in said envelope spaced from the open end of said tube, said tube comprising a central portion extending from the fixed end, and a helical portion extending from the free end of said central portion around the central portion toward the fixed end, said tube including a portion outside the helical portion extending substantially to the free end of the central portion.

5. Means for providing a light source comprising in combination an outer envelope filled with a gaseous medium adapted to emit light when excited by the passage of electric current through it, an elongated tortuous translucent tube having one end opening into the interior of said envelope and the other end fixed to said envelope, an electrode in said tube at said fixed end, and an electrode in said envelope spaced from the open end of said tube, said tube comprising a central portion extending from the fixed end, and a helical portion extending from the free end of said central portion around the central portion toward the fixed end, said tube including a portion outside the helical portion extending substantially to the free end of the central portion, the last named portion being bent to form a series of undulations and encircling the helical portion.

6. Means for providing a light source comprising in combination, an outer envelope filled with a gaseous medium adapted to emit light when excited by the passage of electric current through it, said envelope having a flattened reentrant stem, an anode mounted on said stem, a translucent tube having one end resting on said stem with opposite portions thereof extending over the sides of said stem and sealed thereto, said tube enclosing the anode, two cathodes carried by said stem and spaced outwardly from said tube, whereby either may be used with said anode, said tube comprising a straight central portion extending axially from said stem, and a helical portion extending from the free end of said central portion around the central portion in convolutions terminating adjacent to said stem.

7. Means for providing a light source comprising in combination, an outer envelope filled with a gaseous medium adapted to emit light when excited by the passage of electric current through it, said envelope having a flattened reentrant stem, an anode mounted on said stem, a translucent tube having one end resting on said stem with opposite portions thereof extending over the sides of said stem and sealed thereto, said tube enclosing the anode, two cathodes carried by said stem and spaced outwardly from said tube, whereby either may be used with said anode, said tube comprising a straight central portion extending axially from said stem, and a helical portion extending from the free end of said central portion around the central portion in convolutions terminating adjacent to said stem, both said cathodes having a cleanup material thereon.

8. Means for providing a concentrated light source comprising in combination an outer envelope filled with a gaseous medium adapted to emit light when excited by the passage of electric current through it, an elongated translucent tube having one end sealed to the envelope and the other end opening into the interior of said envelope, an electrode in said tube at the fixed end, and an electrode in said envelope spaced from the open end of said tube, said tube having a central portion about which the major part of the tube is concentrated and said second electrode being mounted adjacent to the fixed end of said tube whereby the light radiating axially of said central portion away from the fixed end of the tube is substantially unobstructed, and said electrode in the tube having an area quite small in comparison with the area of the other electrode.

ANDREW F. HENNINGER.
GEORGE D. HENNINGER.